(No Model.)

H. C. WHITCOMB & J. H. WARE.
ELECTROTYPE PLATE HOLDER.

No. 568,390. Patented Sept. 29, 1896.

WITNESSES
A. A. Ponney.
C. G. Graydon.

INVENTORS.
Henry C. Whitcomb
Joseph H. Ware
By their Atty
Henry W. Williams

UNITED STATES PATENT OFFICE.

HENRY C. WHITCOMB AND JOSEPH H. WARE, OF BOSTON, MASSACHUSETTS.

ELECTROTYPE-PLATE HOLDER.

SPECIFICATION forming part of Letters Patent No. 568,390, dated September 29, 1896.

Application filed December 5, 1895. Serial No. 571,110. (No model.)

*To all whom it may concern:*

Be it known that we, HENRY C. WHITCOMB and JOSEPH H. WARE, citizens of the United States, residing at Boston, in the county of Suffolk and State of Massachusetts, have invented new and useful Improvements in Electrotype-Plate Holders, of which the following is a specification.

This invention relates to that class of holders or blocks which are so constructed that the plates may be removably applied thereto, so that one plate may be substituted for another, or a number of plates applied in succession to the block or holder; and the invention consists in the novel construction and arrangement of parts hereinafter described, whereby the sliding in of the plate is facilitated; the ends of the side strips prevented from catching and being peeled or stripped from the block, and the device rendered more efficient and less liable to get out of repair.

The nature of the invention is fully described below and illustrated in the accompanying drawings, in which—

Figure 1:
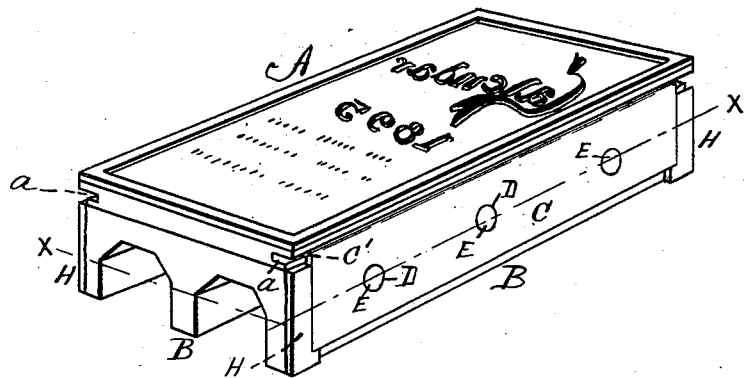
Figure 2:
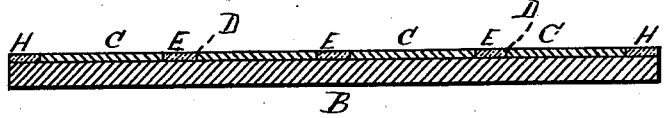
Figure 2:
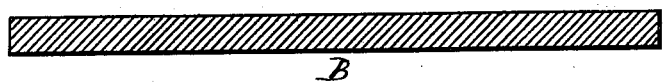
Figure 2:
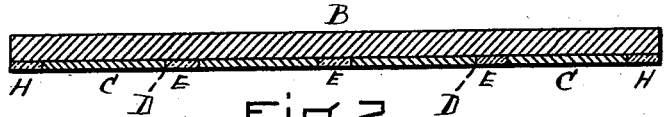
Figure 3:
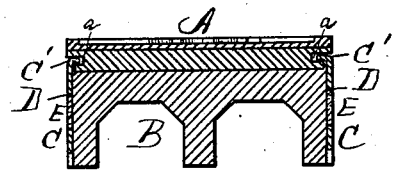

Figure 1 is a view in perspective of a holder or base and plate embodying our invention. Fig. 2 is a horizontal section taken on line $x$, Fig. 1. Fig. 3 is a transverse vertical section of the same.

Similar letters of reference indicate corresponding parts.

A represents the plate, provided with the grooves $a$ on its opposite edges, said grooves not being claimed as new in this invention.

B represents the block or holder, sometimes termed a "base."

C C are longitudinal strips or side plates applied to the opposite sides of the block, extending above the same, and provided with lips C', which extend into the grooves $a$ in the plate. These strips are furnished with a suitable number of holes or perforations D, and when said strips are laid against the side of the holder these holes are filled with solder E, which, adhering to the block or base B, secures said strips in position without the use of screws, pins, or other mechanical appliances. The fillings of solder E are made flush with the surface of the plate, in order that there may be no projecting edges. It will be noticed by reference to Figs. 1 and 2 that the side plates or strips C do not extend to the ends of the block. This is in order that the strips, which are made preferably of brass, may be protected from the liability of catching and peeling off. The spaces between the ends of the brass strips and the ends of the block are occupied and filled by the layers of solder H, the surface of said layers being flush with the surface of the strips C. Thus the side strips are protected from injury and are doubly secured in position, the latter without the use of such mechanical connections as screws or bolts, while the appearance and practical effect is that of a smooth and unbroken surface on the sides of the block. Moreover, the plate is provided with a resting place before it is slid in between the lips on the brass strips, thus facilitating its ready engagement therewith.

Having thus fully described our invention, what we claim, and desire to secure by Letters Patent, is—

The combination with the block B and grooved plate A, of the strips or side plates C provided at their upper edges with the engaging lips C', said strips C being made shorter than the block whereby their ends are some distance from the ends of said block, and the layers H of solder filling the spaces between the ends of the strips and the ends of the blocks and formed with their surfaces flush with the surfaces of the said strips, substantially as set forth.

HENRY C. WHITCOMB.
JOSEPH H. WARE.

Witnesses:
HENRY W. WILLIAMS,
A. N. BONNEY.